(12) United States Patent
Ellison et al.

(10) Patent No.: US 9,230,608 B2
(45) Date of Patent: Jan. 5, 2016

(54) FILTER ELEMENT FOR DISC DRIVE ENCLOSURE

(71) Applicant: Seagate Technology LLC, Cupertino, CA (US)

(72) Inventors: David J. Ellison, Minneapolis, MN (US); Timothy W. Stoebe, Minnetonka, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 35 days.

(21) Appl. No.: 13/922,389

(22) Filed: Jun. 20, 2013

(65) Prior Publication Data

US 2014/0377143 A1 Dec. 25, 2014

(51) Int. Cl.
*B01D 46/10* (2006.01)
*G11B 33/14* (2006.01)
*G11B 25/04* (2006.01)

(52) U.S. Cl.
CPC ............ *G11B 33/146* (2013.01); *G11B 25/043* (2013.01)

(58) Field of Classification Search
USPC ........ 55/385.6, 385.4, 501, 525; 96/153, 139, 96/152, 154, 147, 130; 454/184; 360/97.02, 97.03, 97.04, 99.19
See application file for complete search history.

(56) References Cited

U.S. PATENT DOCUMENTS

| 6,712,887 | B2 | | 3/2004 | Ueki et al. |
| 6,846,554 | B2 | | 1/2005 | Fryxell et al. |
| 7,166,142 | B2 | | 1/2007 | Tuma et al. |
| 7,300,500 | B2 | * | 11/2007 | Okada et al. ..................... 96/153 |
| 7,485,225 | B2 | * | 2/2009 | Krogue et al. ................ 210/263 |
| 7,521,137 | B2 | * | 4/2009 | Hohlfeld et al. ........... 428/831.2 |
| 7,662,291 | B2 | * | 2/2010 | Krogue et al. ............... 210/688 |
| 7,727,306 | B2 | * | 6/2010 | Krogue et al. .................... 95/24 |
| 7,767,004 | B2 | | 8/2010 | Sayari et al. |
| 7,811,539 | B2 | * | 10/2010 | Deeken et al. ............. 423/245.3 |
| 7,848,051 | B2 | | 12/2010 | Hong et al. |
| 8,062,523 | B2 | * | 11/2011 | Cloud et al. ............. 210/321.85 |
| 8,123,830 | B2 | | 2/2012 | Camalig et al. |
| 8,194,345 | B2 | | 6/2012 | Kwon et al. |
| 8,197,687 | B2 | * | 6/2012 | Krogue et al. ................ 210/282 |
| 8,254,055 | B2 | * | 8/2012 | Brown ........................ 360/97.12 |
| 8,293,105 | B2 | * | 10/2012 | Krogue et al. ................ 210/266 |
| 8,369,043 | B2 | | 2/2013 | Kong et al. |
| 8,377,182 | B2 | * | 2/2013 | Li et al. ............................. 96/134 |
| 2006/0077150 | A1 | * | 4/2006 | Sampsell ......................... 345/85 |
| 2007/0268581 | A1 | * | 11/2007 | Palmateer ..................... 359/512 |
| 2010/0086460 | A1 | * | 4/2010 | Deeken et al. ............. 423/245.1 |
| 2012/0073253 | A1 | * | 3/2012 | Bishop et al. .................... 55/495 |
| 2014/0030179 | A1 | * | 1/2014 | Miller, III .................. 423/245.1 |

OTHER PUBLICATIONS

Donaldson Filtration Solutions, Adsorbent Label Filter (ALF), printed from www.donaldson.com on Apr. 23, 2013.
Donaldson Filtration Solutions, Adsorbent Pouch Filter (APF), printed from www.donaldson.com on Apr. 23, 2013.
Donaldson Filtration Solutions, Adsorbent Recirculation Filter (ARF), printed from www.donaldson.com on Apr. 23, 2013.

* cited by examiner

*Primary Examiner* — Duane Smith
*Assistant Examiner* — Minh-Chau Pham
(74) *Attorney, Agent, or Firm* — HolzerIPLaw, PC

(57) ABSTRACT

A recirculation filter element for a disc drive enclosure. The filter element has a body having a surface area to volume ratio of at least 100/m and a self-assembled monolayer. The self-assembled monolayer may adsorb volatile contaminants from the enclosure or may have a chemical affinity to particulates, to accumulate and sequester particles on the body.

19 Claims, 2 Drawing Sheets

FILTER ELEMENT FOR DISC DRIVE ENCLOSURE

BACKGROUND

Disc drives are sensitive to moisture, chemical contamination, and particulate contamination. Chemical contaminants, such as hydrocarbons and acid gases, can condense onto a disc and degrade the head/disc interface and possibly corrode the heads. Particulate contaminants can lead to head and media scratches, and can cause read/write errors and can lead to interface failure and head crashes. As the drive heads become smaller and areal densities increase, disc drives are more susceptible to these contaminants.

Most current disc drives include a filter to remove particles (i.e., a particle filter) and a filter to remove gaseous contaminants (i.e., a chemical filter). The chemical filter typically includes activated carbon. It is well known that a life span of a chemical filter is limited by the amount of adsorption material (e.g., the activated carbon) and its surface area available for adsorption. With the continuing tendency to increase areal densities of disc drives and to reduce their size, having a relatively small chemical filter, with a relatively limited surface area for adsorption, may result in potential susceptibility to contaminants.

Breather and recirculation filters have been used in hard disc drives for removing contaminates. Typically, recirculation filters have been included to remove unwanted particulates. They are not, however, typically suitable for removing organic vapors since they do not have a capacity for permanently adsorbing organic vapors. To provide enhanced organic vapor removal, activated carbon or other adsorbent material has been used in recirculation filters as well as breather filters. For example, activated carbon in the form of granules or fiber can adsorb and remove organic vapors from the air within a disc drive housing.

The present disclosure provides a recirculation chemical filter for inside disc drive enclosures.

SUMMARY

One particular embodiment of this disclosure is a filter element for a disc drive enclosure, the filter element comprising a body having a surface area to volume ratio of at least 100/m and a self-assembled monolayer to adsorb volatile contaminants on the body. The body may comprise, for example, activated carbon, silica gel, an aerogel, activated alumina, zeolite, clinoptilolite, clay, iron oxide, magnesium percarbonate, or ion exchange resin. The self-assembled monolayer may include a terminal hydrocarbon, terminal ketone, terminal alcohol, terminal amine, or a terminal sulfur functional group.

Another particular embodiment of this disclosure is a recirculation filter element for a disc drive enclosure, the filter element comprising a body having a surface area to volume ratio of at least 600/m and an oleophilic self-assembled monolayer. The body may comprise, for example, activated carbon, silica gel, an aerogel, activated alumina, zeolite, clinoptilolite, clay, iron oxide, magnesium percarbonate, or ion exchange resin. The self-assembled monolayer may include a terminal hydrocarbon, terminal ketone, terminal alcohol, terminal amine, or a terminal sulfur functional group.

Yet another particular embodiment of this disclosure is a recirculation filter element for a disc drive enclosure, the filter element comprising a body comprising a zeolite and a self-assembled monolayer, such as an oleophilic self-assembled monolayer.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which.

DETAILED DESCRIPTION

The present embodiments relate most generally to a disc drive with a filter element in the disc drive enclosure. The filter element is configured to remove chemical contaminants from the internal disc drive atmosphere, particularly, to remove organic vapors and droplets, such as lubricant vapors and droplets from the internal disc drive atmosphere. The filter element includes a self-assembled monolayer (SAM) coating on a high surface area to volume ratio adsorbent or absorbent material, such as zeolite.

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower", "upper", "beneath", "below", "above", "on top", etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above those other elements.

Figure 1:
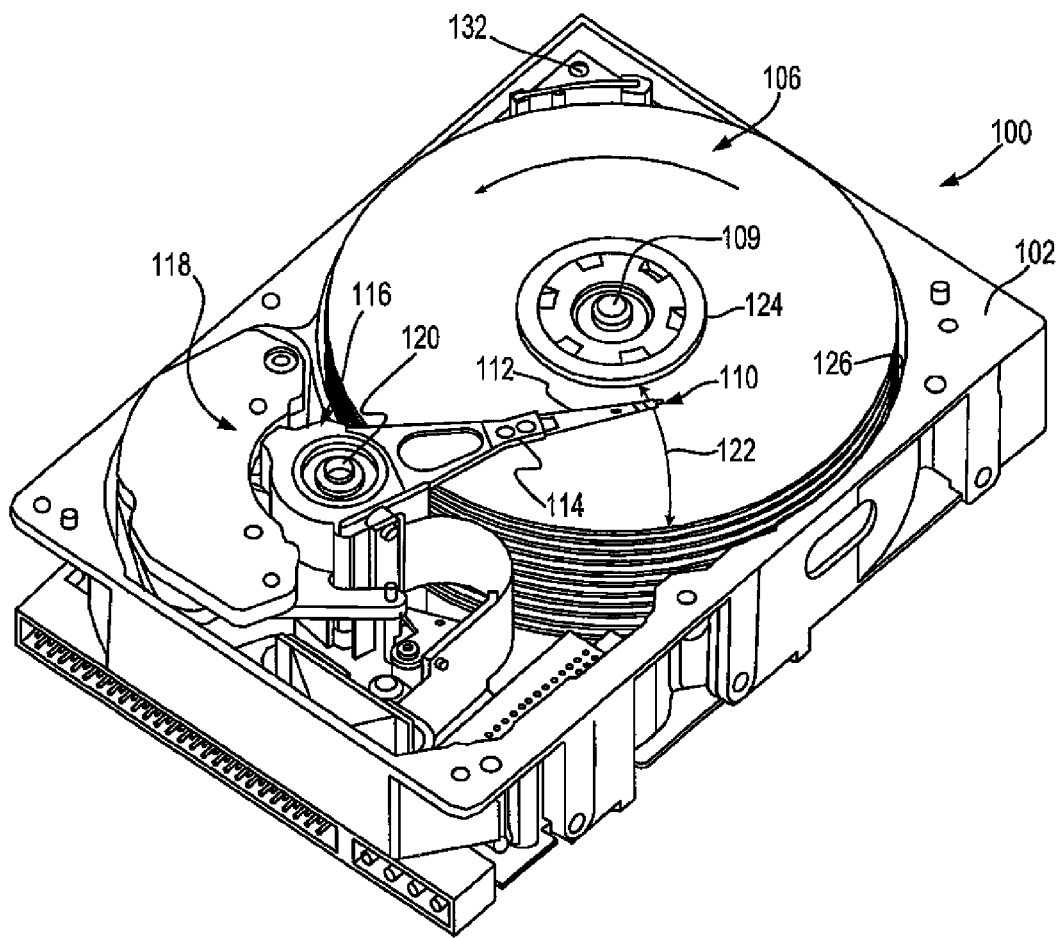
FIG. 1 is a perspective view of a data storage device, particularly, a disc drive.

Referring to FIG. 1, a top perspective view of a disc drive or data storage device 100 is shown. Disc drive 100 is provided to show an exemplary environment in which various embodiments of the present invention can be practiced. It will be understood, however, that the claimed invention is not so limited. Disc drive 100 includes a housing 102 typically formed from a base and a top cover (not shown in FIG. 1). Disc drive 100 further includes a single disc or a disc pack 106 of multiple discs, which is mounted on a spindle motor (not shown) for co-rotation about central axis 109. It should be noted that a pack of multiple discs is utilized in some embodiments, and only a single disc 106 is used in other embodiments. Each disc surface has an associated head or slider 110 which is mounted in communication with the disc surface. In the example shown in FIG. 1, slider 110 is supported by suspension 112 which is in turn attached to a load beam arm 114 of an actuator 116. The actuator 116 shown in FIG. 1 is of the type known as a rotary moving coil actuator and includes a voice coil motor (VCM), shown generally at 118. Voice coil motor 118 rotates actuator 116 with its attached slider 110 about a pivot shaft 120 to position head 110 over a desired data track along an arcuate path 122 between a disc inner diameter 124 and a disc outer diameter 126.

Present in housing 102 is a filter receiving area 132. In the illustrated embodiment, filter area 132 has a groove configured to receive and support a filter element therein. Although FIG. 1 shows filter receiving area 132 in a corner of housing 102, the particular location, configuration, shape and size of the filter receiving area can vary, together with the configuration, shape and size of the filter element.

The filter element of this disclosure is configured to reduce chemical contaminants within an electronic enclosure, such as housing 102 of disc drive 100. Common sources of contaminants in disc drives include leaks (which may or may not be intentional), the manufacturing environment, and the materials incorporated into the disc drive, which may give off gases. It is of particular concern that organic vapors can be generated inside disc drive enclosures during normal operating conditions when, for example, the temperature exceeds 150° F. (about 65° C.). Such temperatures can be achieved by simply leaving the computer in the trunk of a car on a hot day or during operation. Lubricant, typically present at or near voice coil motor 118 and pivot shaft 120, is a common source of contaminant. The filter element of this disclosure is particularly configured to remove organic vapors and droplets, such as lubricant vapors and droplets.

It should be appreciated that in the context of this invention the reference to the "removal" or "reduction" of contaminants refers to the clarification of a fluid (e.g., gas) being filtered. The fluid being clarified in a disc drive enclosure is typically an air stream. It should be appreciated, however, that streams of other gases could also be clarified by the filter element of the present invention. The reduction or removal of contaminants from a liquid or gas stream by a filter construction can also be referred to as entrapment, immobilization, adsorption, absorption, or otherwise binding (e.g., by covalent, ionic, coordinative, hydrogen, or Van der Waals bonds, or combinations thereof) of the contaminants inside or on the surface of the filter element.

The filter element of this disclosure is configured to reduce contaminants by a variety of processes. The primary process for reducing, removing or preventing contamination within the housing is to reduce or remove contaminants present in the housing atmosphere. The 'recirculation filter' aspect of the filter element is constructed for this purpose. An optional, secondary process for reducing, removing, or preventing contamination within the housing is to reduce or remove contaminants entering the housing from regions outside of the housing. The 'breather filter' aspect of the filter element is constructed for this purpose.

Figure 2:
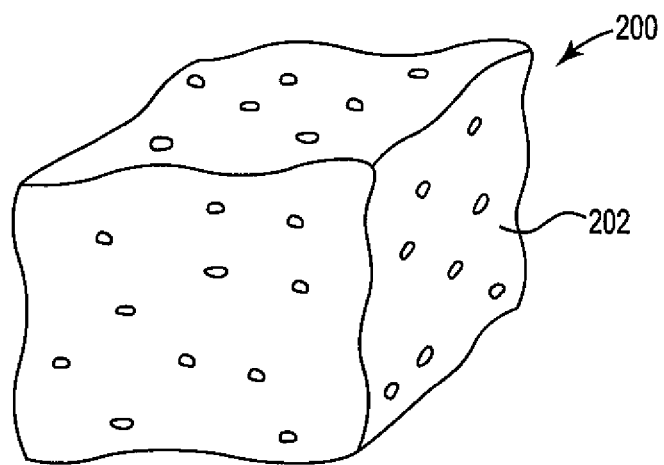
FIG. 2 is a schematic perspective view of a first embodiment of a filter element.
Figure 3:
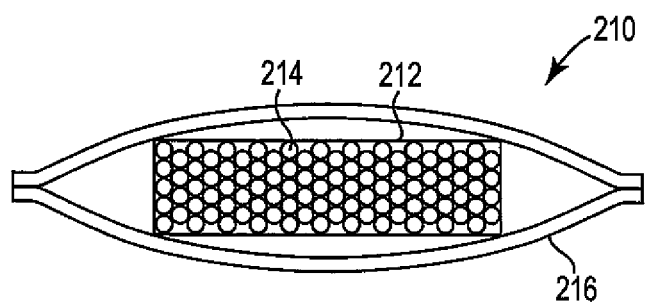
FIG. 3 is a schematic cross-sectional view of a second embodiment of a filter element.

FIGS. 2 and 3 illustrate two embodiments of a filter element of this disclosure. As indicated above, filter element includes a high surface area adsorbent or absorbent material and a self-assembled monolayer (SAM) coating thereon. In FIG. 2, a generally block-shaped filter element 200 is shown. Filter element 200 has a body 202 formed of a high surface area adsorbent or absorbent material. By use of the phrase "high surface area" and variants thereof, what is intended is a material with a surface area to volume ratio of at least 100 $m^2/m^3$, or 100/m. In some embodiments, the high surface area is at least 250/m, in other embodiments at least 500/m. As an example, zeolites and silicates typically have a surface area within the range of about 600/m to 1000/m, and aerogels have a surface area up to $10^9$/m.

In the illustrated embodiment, body 202 is a monolithic structure with high porosity. In FIG. 3, a pouch or pillow-shaped filter element 210 is shown. Filter element 210 has an adsorbent or absorbent material body 212 formed by a plurality of individual particles 214. Body 212 is enclosed in a fibrous enclosure 216. Fibrous enclosure 216 may be present to inhibit any particles 214 from breaking free from body 212 and becoming a particulate contaminant or may be present as a particulate filter, as described further below.

There are no particular restrictions regarding the high surface area material, although the structure is preferably one that has gas adsorbing or absorbing properties even without the SAM coating thereon. The high surface area material may be any conventionally known gas adsorbing agent and can be used singly or in mixtures including those such as activated carbon, silica gel, activated alumina, zeolite, clinoptilolite, various kinds of clay, iron oxide, magnesium percarbonate, ion exchanging resin, aerogel, and the like. The high surface area material has a surface area to volume ratio of at least 100/m, in some embodiments at least 250/m, and in other embodiments at least 500/m. If particulate, the average particle diameter of the gas adsorbing material is usually 0.01 to 5,000 micrometers.

The high surface area material can be present in various kinds of shapes, for example, as in FIG. 2 (i.e., blocky or cubic body 202) or in FIG. 3 (i.e., rectangular or cuboid body 212). Examples of suitable shapes include a cube shape, a cuboid shape, a sheet shape, a spherical or ovoid (egg) shape, a cone, a pyramid, a cylinder, etc.

The largest dimension of the gas adsorption body 202, 212 is usually at least 1 mm and usually no more than 20 mm, although in some embodiments a very long (e.g., greater than 20 mm) and very thick (e.g., about 1 mm thick) body may be suitable. In some embodiments, body 202, 212 has a volume of no more than 1 $cm^3$.

The high surface area material body can be formed by conventional methods by which particulate are molded, for example, with a binder resin or merely by the application of heat and/or pressure. With regard to the molding method, various kinds of thermal molding methods can be utilized including extrusion molding methods, injection molding methods, calendar molding methods, and the like.

Various kinds of thermoplastic resins can be used for the binder resin. These include, for example, fluorine resins containing polytetrafluoroethylene, polyvinylidene fluoride, and the like, polyolefin group resins such as polypropylene, polyethylene, and the like, and polyester group resins such as poly(ethylene terephthalate) and the like, polyvinyl alcohol and various kinds of nylon and the like. The amount of binder resin, if used, is typically 0.1 to 100 parts by weight for 100 parts by weight of particulate.

In both embodiments, filter elements 200, 210 include a SAM present as a coating on body 202 or on particles 214, the SAM selected to be oleophilic. The terms "self-assembled monolayer" and "SAM" as used herein refer to a thin monolayer wherein surface-active molecules present in a reaction solution are provided (e.g., chemisorbed) on the surface of the high surface area material to produce chemical bonds therebetween. The phrase "oleophilic SAM" and variations thereof as used herein refers to a SAM having an oleophilic functional end group, such as saturated hydrocarbons. Other particular examples of suitable terminal groups include alkyls with 1-18 carbon atoms in addition to other unsaturated hydrocarbon variants, such as, aryl, aralkyl, alkenyl, and alkenyl-aryl. Additionally, materials with amine terminations, as well as carbon oxygen functional groups such as ketones and alcohols, will exhibit oleophilic properties.

The SAM selected for filter element 200, 210 can be directed to a particular contaminant or type of contaminant. For example, the akylsilane class of materials, such as n-decyltrichlorosilane, can be used to remove hydrocarbon contaminants such as sebacate and blasocut oils (oils often present in drive spindle bearing 109/124 of FIG. 1), paraffins (often present in the media, adhesives, and plastics in the disc drive), and tooling oil (which might be residual from the assembly process of disc drive 100). A polar (strong fixed dipole) SAM, such as 3-aminopropyltrimethoxysilane, can be used to remove (e.g., adsorb or absorb) polar contaminants such as acidic gases (e.g., $SO_x$, $NO_x$), surfactants (soap) from upstream cleaning processes for the disc drive components, polar or statically charged particles (e.g., alumina particles, metal oxide particles, talc particles) and any moisture that might be present in the enclosure environment. Moisture may be absorbed or adsorbed by the SAM material or by a different material present in the body (e.g., a desiccant). Depending on the SAM material, solid particulates may be accumulated and/or sequestered on filter element 200, 210.

The precursor compound for forming the self-assembled monolayer contains molecules having a head group, a tail, and functional end group. Common head groups include thiols, silanes, phosphonates, etc. SAMs are created by chemisorption of the head groups onto the high surface area material from either a vapor or liquid phase, by processes such as immersion, spraying, vapor deposition, etc. The head groups closely assemble on the material with the tail groups extending away from the material.

Examples of commercially available oleophilic SAM materials fall within the general class of 1-18 carbon alkylsilanes with a hydrolyzable reactive group (e.g., F, Cl, Br, and I) and alkoxys (e.g., methoxy, ethoxy, and propoxy). Such chemicals are readily available, for example, from Gelest and Sigma Aldrich, and include methyltrichlorosilane, ethyltrichlorosilane, propyltrimethoxysilane, hexyltrimethoxysilane, n-octyltriethoxysilane, n-decyltrichlorosilane, dodecyltrichlorosilane, and octadecyltrichlorosilane. In addition to the alkyl class, other functional SAMs, such as the following, are also are advantageous: 3-aminopropyltrimethoxysilane, methyl 11-[dichloro(methyl)silyl]undecanoate, acetoxyethyltrichlorosilane, vinyltriethoxysilane, and nonafluorohexyltrimethoxysilane.

The precursor compound of the SAM may be present in any conventionally-used organic solvent, water, or any mixture thereof. Examples of suitable organic solvents may include, but are not limited to, alcohols (e.g., methyl alcohol, ethyl alcohol, n-propyl alcohol, isopropyl alcohol, n-butyl alcohol, sec-butyl alcohol, t-butyl alcohol, isobutyl alcohol, and diacetone alcohol); ketones (e.g., acetone, methylethylketone, methylisobutylketone); glycols (e.g., ethyleneglycol, diethyleneglycol, triethyleneglycol, propyleneglycol, butyleneglycol, hexyleneglycol, 1,3-propanediol, 1,4-butanediol, 1,2,4-butantriol, 1,5-pentanediol, 1,2-hexanediol, 1,6-haxanediol); glycol ethers (e.g., ethyleneglycol dimethyl ether, and triethyleneglycol diethyl ether); glycol ether acetates (e.g., propylene glycol monomethyl ether acetate (PGMEA)); acetates (e.g., ethylacetate, butoxyethoxy ethyl acetate, butyl carbitol acetate (BCA), dihydroterpineol acetate (DHTA)); terpineols (e.g., trimethyl pentanediol monoisobutyrate (e.g., "TEXANOL" from Eastman Chemical Co.)); dichloroethene (DCE); chlorobenzene; and N-methyl-2-pyrrolidone (NMP).

The concentration of the precursor compound in the solution may be determined by those skilled in the art according to the intended applications and purposes and may be in the range of about 5 to about 20 mM. An immersion or vapor phase step may be performed without particular limitation and may be carried out at room temperature for about 20 to 120 minutes. Similarly, other methods may be carried out by conventional means.

The precursor compound for forming the self-assembled monolayer is selected so that the resulting SAM is oleophilic, to attract and retain any lubricant vapors and droplets, which might be present within the disc drive enclosure. Examples of suitable SAM compounds include fluorinated silane SAMs, such as those within the general class of 1-18 carbon alkylsilanes with a hydrolyzable reactive group (e.g., F, Cl, Br, and I) and alkoxys (e.g., methoxy, ethoxy, and propoxy). Such chemicals are readily available, for example, from Gelest and Sigma Aldrich, and include methyltrichlorosilane, ethyltrichlorosilane, propyltrimethoxysilane, hexyltrimethoxysilane, n-octyltriethoxysilane, n-decyltrichlorosilane, dodecyltrichlorosilane, and octadecyltrichlorosilane. In addition to the alkyl class, other functional SAMs, such as the following, are also are advantageous: 3-aminopropyltrimethoxysilane, methyl 11-[dichloro(methyl)silyl]undecanoate, acetoxyethyltrichlorosilane, vinyltriethoxysilane, and nonafluorohexyltrimethoxysilane.

In some embodiments, two or more different SAM materials may be present on body 202, 212, selected to absorb the same class of contaminates (e.g., hydrocarbons) or for removal of different contaminants.

In some embodiments, the filter element may include a particulate or solid contaminant removal feature, such as fibrous enclosure 216 of filter element 210 of FIG. 3. Examples of particulate or solid contaminant removal elements include, but are not limited to, filter materials such as polymers, non-woven materials, fibers, paper, and the like.

Filter element 200, 210 is positioned within housing 102 in an active air flow location, e.g., in an air stream caused by, for example, rotation of disc 106. Filter element 200, 210 may be referred to as a "recirculation filter" or the like, since it is configured and positioned to remove contaminants present in the enclosure atmosphere. In some embodiments, filter element 200, 210 may be a combined recirculation filter and breather filter, positioned to inhibit entrance of contaminants into housing 102, for example, through a breather hole. Additionally or alternatively, a tortuous or extended path, such as a diffusion channel, can be used to further restrict contaminant entry into housing 102.

Thus, embodiments of the FILTER ELEMENT FOR DISC DRIVE ENCLOSURE are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:
1. A recirculation filter element for a disc drive enclosure, the filter element comprising an adsorbent or absorbent struc- tural body having a surface area to volume ratio of at least 100 $m^2/m^3$ and a self-assembled monolayer to adsorb volatile contaminants on the body.

2. The filter element of claim 1 wherein the body comprises activated carbon, silica gel, an aerogel, activated alumina, zeolite, clinoptilolite, clay, iron oxide, magnesium percarbonate, or ion exchange resin.

3. The filter element of claim 2 wherein the body comprises a zeolite.

4. The filter element of claim 2 wherein the body comprises a plurality of particles molded to form the body.

5. The filter element of claim 4 wherein the body further comprises a resin binder.

6. The filter element of claim 1 wherein the self-assembled monolayer comprises reactive organo-silane or reactive mercapto compounds.

7. The filter element of claim 1 wherein the self-assembled monolayer comprises a terminal hydrocarbon, terminal ketone, terminal alcohol, terminal amine, or a terminal sulfur functional group.

8. The filter element of claim 7 wherein the self-assembled monolayer comprises a plurality of different terminal functional groups.

9. The filter element of claim 1 wherein the self-assembled monolayer comprises a fluorinated silane.

10. The filter element of claim 1 wherein the body has a surface area to volume ratio of at least 250 $m^2/m^3$.

11. The filter element of claim 1 wherein the self-assembled monolayer further accumulates and/or sequesters particles on the body.

12. The filter element of claim 1 wherein the self-assembled monolayer is oleophilic.

13. The filter element of claim 1 wherein the self-assembled monolayer comprises reactive organo-silane or reactive mercapto compounds.

14. A recirculation filter element for a disc drive enclosure, the filter element comprising an adsorbent or absorbent structural body having a surface area to volume ratio of at least 600 $m^2/m^3$ and an oleophilic self-assembled monolayer.

15. The filter element of claim 14 wherein self-assembled monolayer comprises a plurality of terminal functional groups selected from the group consisting of hydrocarbon, ketone, alcohol, amine, and sulfur.

16. The filter element of claim 15 wherein the self-assembled monolayer has a chemical affinity to particulate.

17. The filter element of claim 14 wherein the self-assembled monolayer comprises a fluorinated silane, a reactive organo-silane or a reactive mercapto compound.

18. The filter element of claim 14 wherein the body comprises activated carbon, silica gel, an aerogel, activated alumina, zeolite, clinoptilolite, clay, iron oxide, magnesium percarbonate, or ion exchange resin.

19. A recirculation filter element for a disc drive enclosure, the filter element consisting of a structural body comprising an adsorbent or absorbent material and having a surface area to volume ratio of at least 100 $m^2/m^3$, and a self-assembled monolayer on the body, and optionally a fibrous enclosure around the structure body and the self-assembled monolayer.

* * * * *